United States Patent [19]
Takahashi et al.

[11] Patent Number: 5,263,078
[45] Date of Patent: Nov. 16, 1993

[54] MOBILE FACSIMILE TELECOMMUNICATIONS SYSTEM CAPABLE OF AUTOMATICALLY OFF-HOOKING A FACSIMILE DEVICE

[75] Inventors: Cuisei Takahashi; Hiroshi Etoh, both of Tokyo, Japan

[73] Assignee: Oki Electric Industry Co., Ltd., Tokyo, Japan

[21] Appl. No.: 648,154

[22] Filed: Jan. 30, 1991

[30] Foreign Application Priority Data

Jan. 31, 1990 [JP] Japan .................................. 2-21507
Feb. 6, 1990 [JP] Japan .................................. 2-26941

[51] Int. Cl.$^5$ ..................... H04M 11/00; H04M 1/64
[52] U.S. Cl. .................................. 379/58; 379/88; 379/89; 379/93; 379/98
[58] Field of Search ............... 379/58, 56, 100, 90, 379/98, 97, 93, 89, 88, 67

[56] References Cited

U.S. PATENT DOCUMENTS

| | | | |
|---|---|---|---|
| 4,825,461 | 4/1989 | Kurita et al. | 379/93 |
| 4,837,812 | 6/1989 | Takahashi et al. | 379/98 |
| 4,977,609 | 12/1990 | McClure | 455/89 |
| 4,989,232 | 1/1991 | Tsumura | 379/88 |
| 4,991,201 | 2/1991 | Tseng | 379/100 |
| 5,046,187 | 9/1991 | Takahashi | 379/93 |
| 5,159,624 | 10/1992 | Makita | 379/57 |

*Primary Examiner*—Curtis Kuntz
*Assistant Examiner*—William Cumming
*Attorney, Agent, or Firm*—Edward D. Manzo

[57] ABSTRACT

A mobile facsimile telecommunications system utilizes an automobile telephone system as a transmission path. In one aspect, this system utilizes an adaptor which can place the facsimile device under an off-hook condition without using an ordinary telephone set additionarily provided to compensate for defects of a portable-type facsimile device having no dialing function, thereby achieving its simplification of system construction as well as the reduction of telephone charges. In another aspect, this system utilizes an automatic response function, a polling transmission function using a given default value, and an automatic off-hook function specified by an operator after conversation, thereby rendering the manipulation for facsimile communication simple.

7 Claims, 8 Drawing Sheets

Fig. 8

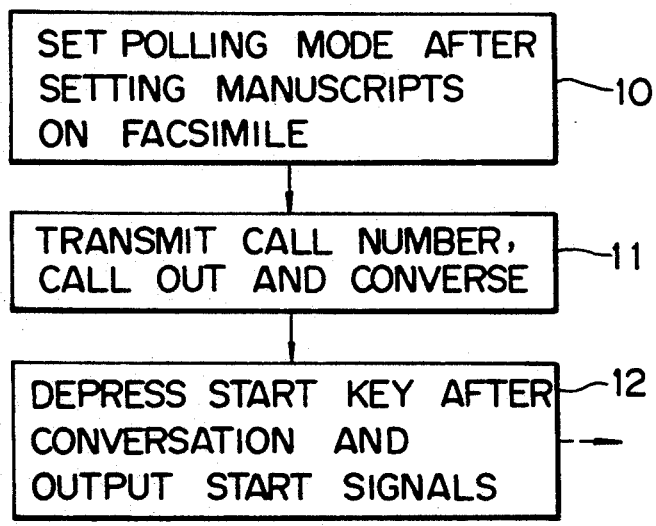

⟨RADIO TELEHONE 1⟩ ⟨ADAPTOR 2⟩ ⟨FACSIMILE 3⟩

| | | |
|---|---|---|
| | | SET POLLING MODE AFTER SETTING MANUSCRIPTS ON FACSIMILE —10 |
| | | TRANSMIT CALL NUMBER, CALL OUT AND CONVERSE —11 |
| | | DEPRESS START KEY AFTER CONVERSATION AND OUTPUT START SIGNALS —12 |

CALL SIGNAL SEND –•–

–•– OFF HOOK

DIS SENDING (S/R) –•– ANSWER SIGNAL SENDING

–•– DIS SENDING (R)

DTC SENDING –•–

–•– TRAINING, TCF

CER SENDING –•–

–•– PICTURE DATA (MH/MR)

–•– PICTURE DATA CONVERSION, SEND –•–

–•– RTC SENDING

–•– EOP SENDING

MOBILE FACSIMILE TELECOMMUNICATIONS SYSTEM CAPABLE OF AUTOMATICALLY OFF-HOOKING A FACSIMILE DEVICE

BACKGROUND OF THE INVENTION

1. Field of the Invention

This invention relates to a mobile facsimile telecommunications system utilizing an automobile telephone system as a transmission path in general, and more particularly to an adaptor to be used between an automobile telephone device and a portable-type facsimile device having no dialing function in such a facsimile telecommunications system, and to a method of performing facsimile transmission by utilizing a polling transmission function of a facsimile device which is coupled, via an adaptor, to an automobile telephone device or a wireless telephone device with equivalent properties.

2. Description of the Prior Art

A mobile facsimile telecommunications system illustrated in FIG. 1 is well known as one prior technique for performing facsimile telecommunications utilizing an automobile telephone system as a transmission path.

In FIG. 1, the mobile facsimile telecommunications system comprises an automobile telephone device 1 including a radio transceiver 1a and a telephone set 1b, an adaptor 2 coupled to the telephone device 1, a facsimile device 3 connected to the adaptor 2, and an ordinary telephone set 5 connected to the facsimile device 3 through a cable 4 serving as an interface based on a two-wire loop dialing system (identical with an ordinary telephone subscriber line). In this arrangement, one end of the cable 4 is connected to telephone terminals of the facsimile device 3.

As illustrated in FIG. 3, the adaptor 2 comprises a MODEM 2a containing a network control unit (NCU) having an interface function for coupling the automobile telephone device 1 to the ordinary telephone subscriber line and a data processing unit for reading and discriminating serial data S1 of a given format transmitted from the automobile telephone device 1, a controller 2b including a G3-class communication control 2b-1, a main control 2b-2 constructed by a CPU, a ROM and a RAM and a RF communication control 2b-3, and for outputting a control signal S2 corresponding to the serial data S1, a V.27 ter. MODEM 2C in conformity with the Recommendations of the CCITT, and a central-office line part 2d constructed in an ordinary telephone subscriber signal format, adapted to be controlled by the control signals S2 from the controller 2b and provided with an interface function for the facsimile device 3.

In addition, the G3 communication control 2b-1 is provided with the same procedure as that of a standard G3 facsimile device in conformity with the CCITT Recommendations, and the MODEM 2a is provided with an error correction control function introduced by taking a wireless trunk line into account. The ordinary telephone set 5 in FIG. 1 is used because most of facsimile devices are not generally provided with dialing and polling transmission functions.

In operation, an operator first makes a telephone call to the other party and talks over the telephone by use of the telephone set 1b of the automobile telephone device 1, and then hangs up the phone after conversation. Next, the operator sets a manuscript into the facsimile device 3 and dials or phones again by use of the ordinary telephone set 5. At this juncture, the ordinary telephone set 5 and the adaptor 2 are placed under off-hook conditions due to a loop current flowing through a network control circuit (NCU) in the facsimile device 3.

The dial signals from the ordinary telephone set 5 are transmitted to the adaptor 2 through the NCU of the facsimile device 3. The adaptor 2 transforms the dial signals into a dial signal format suitable for an automobile telephone and sends them out to the radio transceiver 1a. When connected with a destined party, the adaptor 2 provides a response signal to the ordinary telephone set 5. Then, the operator confirms the presence of the response signal and will depress a start key on the facsimile device 3. Thus, the content of the manuscript is scanned and transmitted to the called party through the radio transceiver 1a.

As clearly understood from the foregoing, in the facsimile telecommunications system using such adaptor as illustrated in FIG. 3, it is required for the operator to manipulate two telephone sets. In fact, since the operator must enter into the facsimile communication by originating calls again after conversation, it will result in an increase of manipulation time and telephone charges. Besides, from the economical and special points of view, there were some problems in the use of an ordinary telephone set.

As another prior art for a facsimile telecommunications system in a moving body, T. Takahashi et al. "Error-Free FAX Communication Adaptor" Journal of Technology Transfer, Vol.12, No.11, pp.30-31, 1989 exhibits such an arrangement as indicated in FIG. 2.

In FIG. 2, a facsimile telecommunications system in a moving body comprises a wireless telephone device 1 mounted on a moving body such as automobiles or the like, for example. The wireless telephone device 1 includes a radio transceiver 1a, and a telephone set 1b provided with a key 1b-1 for transmitting an initiation signal S1 which is serial data of a given format. An adaptor 2 is coupled to the radio transceiver 1a and the telephone set 1b by way of cables A, A on one hand, and also coupled via cable B to a standard G3 facsimile device 3 recommended by CCITT on the other hand.

In the aforesaid arrangement, the cables A and B are interface cables. In particular, the cable A is a cable used for interfacing between the radio transceiver 1a and the telephone set 1b, and the cable B is an interface cable suitable for a two-wire loop dialing system. In addition, the facsimile device 3 includes a start key and a hook switch (both, not shown) and is provided with automatic response and polling transmission functions. The polling function is an alternative to contention networks wherein terminals are polled in sequence to see if they have anything to send. Polling prevents any one terminal from an overly long wait.

FIG. 4 is a detailed functional block diagram of the adaptor 2 in FIG. 2 and generally similar to that of FIG. 3, excepting for that the MODEM 2a in FIG. 3 is replaced by a cellular MODEM 2a' which includes an NCU (Network Control Unit) having an interface function for the wireless telephone device 1 and an ordinary telephone subscriber line, and is provided with modulation/demodulation and received-data error correction control functions. As seen from FIG. 4, the adaptor 2 comprises the cellular MODEM 2a' having various functions mentioned above, a controller 2b including a G3 communication control 2b-1 with a control function for the facsimile device 3, a main control 2b-2 and an RF communication control 2b-3 for controlling the cellular MODEM 2a', a V.27 ter. MODEM 2c with an interface function for the G3 communication control 2b-1 in conformity with the Recommendations of CCITT, and a central office line part 2d provided with an ordinary telephone subscriber signal format as well as interface function to the facsimile device 3 for outputting a call signal S2'.

In this arrangement, the call signal S2' has an on-off ratio of 201 PM and a make ratio of 33, and the frequency of 400 Hz is modulated with a signal of more than 15 Hz and less than 20 Hz.

The conventional facsimile telecommunications system constructed as shown in FIG. 2 is operated through the following steps:

(1) Set the manuscript to the facsimile device 3;

(2) Make a phone call to the receiving party using the telephone set 1b on the wireless telephone device 1;

(3) Depress the key 1b-1 on the telephone set 1b after having a conversation with the receiving party;

(4) Manipulate the hook switch or the start key on the facsimile device 3 after confirming the presence of the response signals from the adaptor 2.

As the result of the abovementioned procedures, the facsimile telecommunications system in the moving body indicated in FIG. 2 operates as follows.

In the step (3), when the key 1b-1 is depressed, the initiation signal S1 assigned to the key 1b-1 in advance is applied to the cellular MODEM 2a', and the operation thereof is conveyed to the controller 2b. Then, the controller 2b causes the central office line part 2d to generate the call signal S2' and to provide the facsimile device 3 with the call signal S2'. The facsimile device 3 will respond to it through the manipulation of the hook switch or the start key specified in the step (4). As the result, the facsimile device 3 is placed under an off-hook condition on a loop formed in between the adaptor 2 and itself via the cable B.

This condition corresponds to PHASE A (Call Setting) in the transmission control procedures based on the CCITT Recommendation T-30. Communication between the facsimile device 3 and the G3 communication control 2b-1 is successively continued according to the procedures of PHASE B (Premessage procedure), PHASE C (Message procedure), PHASE D (Postmessage procedure), and PHASE E (Call cancellation).

As described above, in order to send out the content of the desired manuscript using the facsimile telecommunications system illustrated in FIG. 2, the operator is required to depress the key 1b-1 provided on the telephone set 1b after conversation as pointed out in the step (3) and thereafter to manipulate the hook switch or the start key, thereby rendering the operationality in the case of the manuscript transmission rather complex or troublesome.

Besides, supposing that the telephone set 1b is located around the seat for a driver, whereas the facsimile device 3 is located at a back seat, for example, to which the driver himself may not reach from his position, the driver is required to move to the place where the facsimile device 3 is located within the car in order to manipulate the hook switch or the start key after depressing the key 1b-1 on the telephone set 1b. It will be clear that the operationality in this case becomes more complex or troublesome as compared to the previously mentioned case where the telephone set 1b and the facsimile device 3 are placed adjacent to each other.

SUMMARY OF THE INVENTION

With foregoing situation in view, the present invention has its primary object of the provision of a mobile facsimile communication adaptor which is simple in system construction with an ordinary telephone set omitted.

It is another object of the present invention to provide a mobile facsimile communication adaptor capable of automatically transmitting the content of the manuscript through the use of a telephone line only once, thereby enabling the reduction of the number of manipulations as well as telephone charges.

It is still another object of the present invention to provide a facsimile telecommunications system in a moving body, which is free of troublesome manipulation, especially in case where a wireless telephone device and a facsimile device are mounted at different places spaced apart from each other.

Further objects and advantages of the present invention will become apparent as the following description proceeds, and the features of novelty characterizing the invention will be pointed out with particularity in the claims annexed to and forming a part of the specification.

Briefly, in keeping with the principle of the present invention, the objects in one embodiment are accomplished with the unique combination of a facsimile device and an inventive adaptor comprising a MODEM having an off-hook means for off-hooking between the facsimile device and an ordinary telephone subscriber line and provided with functions of reading and discriminating serial data of a given format transmitted from an external mobile wireless telephone device and of interfacing between the mobile wireless telephone device and the ordinary telephone subscriber line, a controller for outputting a control signal corresponding to the serial data, and a central office line part controlled with the control signal for off-hooking an external facsimile device.

The objects of another embodiment in accordance with the present invention are accomplished by a mobile facsimile telecommunications system comprising a wireless telephone device and a facsimile device provided with automatic response and polling transmission functions, and operated according to a method including the steps of setting a manuscript to the facsimile device, setting the facsimile device to the automatic response and polling transmission function modes by use of a given default value, calling the receiving party on the telephone and having a conversation with it by means of the wireless telephone device, and manipulating the key on the wireless telephone device after conversation to automatically establish the off-hook condition of the facsimile device.

BRIEF DESCRIPTION OF THE DRAWINGS

The noble features of the subject invention, as well as the invention itself, and the objects and advantages thereof will be better understood from the accompanying description taken in conjunction with the accompanying drawings in which:

FIGS. 7 and 8 show sequence diagrams used for transmission of picture data in the first and second embodiments, respectively.

DESCRIPTION OF THE PREFERRED EMBODIMENTS

Figure 5:
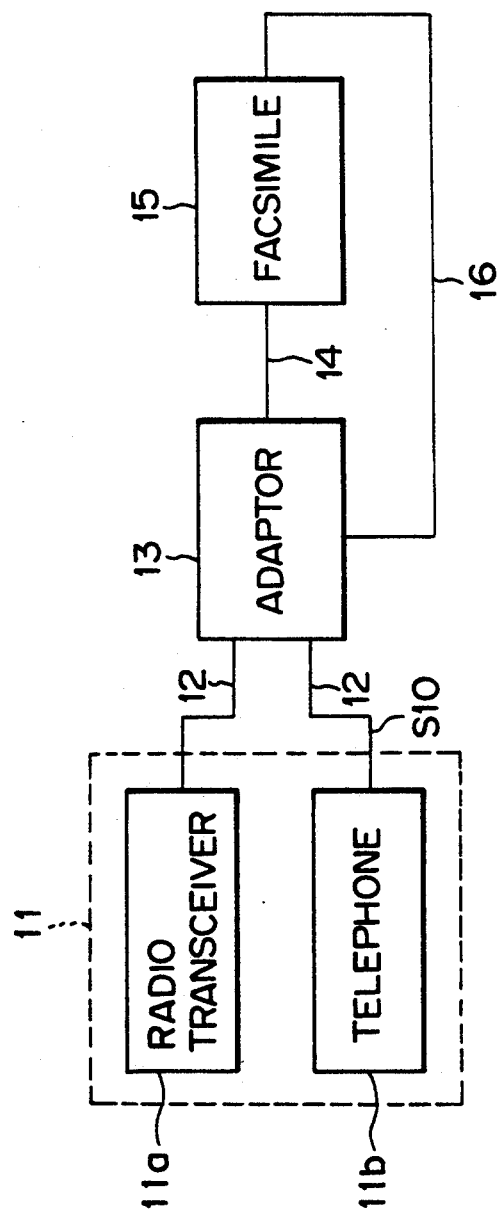
FIG. 5 is a functional block diagram of a mobile facsimile telecommunications system corresponding to the first embodiment of the present invention.

Referring now to FIG. 5 wherein a facsimile telecommunications system of the first embodiment in accordance with the present invention is illustrated in the form of a block diagram, it can be seen that the first embodiment comprises an automobile telephone device 11 having a radio transceiver 11a and a telephone set 11b provided with an initiation key (not shown) for generating an off-hook signal S10 corresponding to serial data of a given format, an adaptor 13 coupled to the radio transceiver 11a and the telephone set 11b via cables 12, 12 including serial data lines for the off-hook signals S10, and a facsimile device 15 having no dialing function and connected to the adaptor 13 via a cable 14. In this arrangement, the cable 14 is provided with identical interfacing properties with respect to the radio transceiver 11a and the telephone set 11b and connected to line terminals of the facsimile device 15 on one end and to FAX terminals of the adaptor 13 on the other end. In addition, telephone terminals of the facsimile device 15 are connected to ordinary telephone subscriber line terminals of the adaptor 13 by way of a cable 16.

Figure 3:
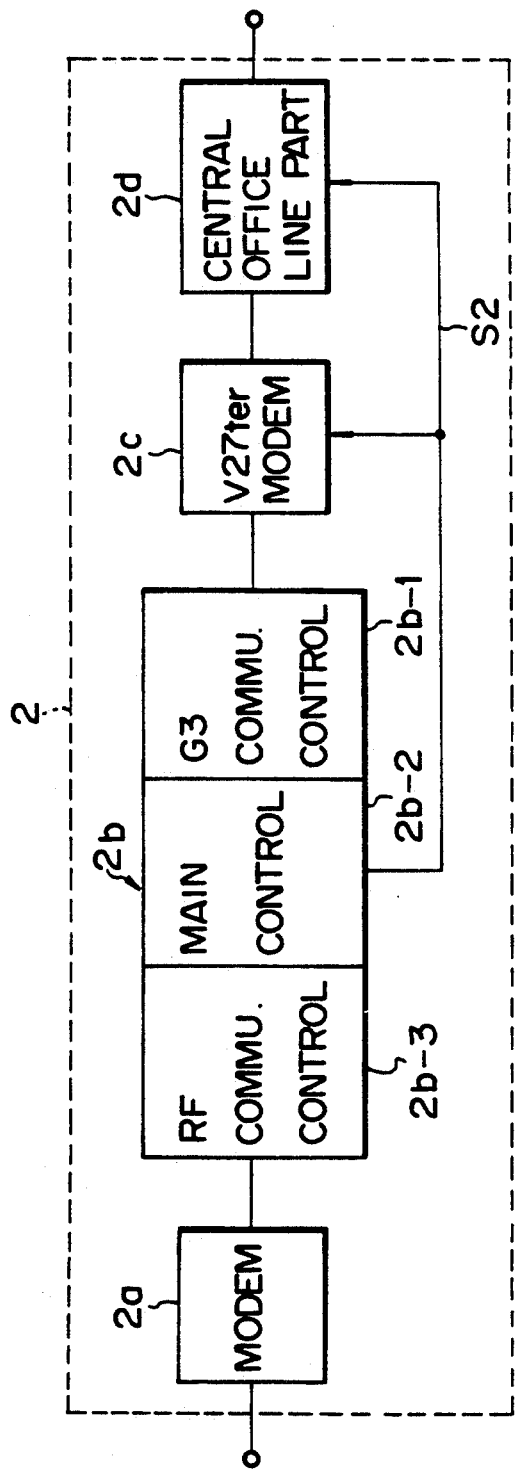
FIG. 3 is a functional block diagram of an adaptor in FIG. 1.
Figure 6:
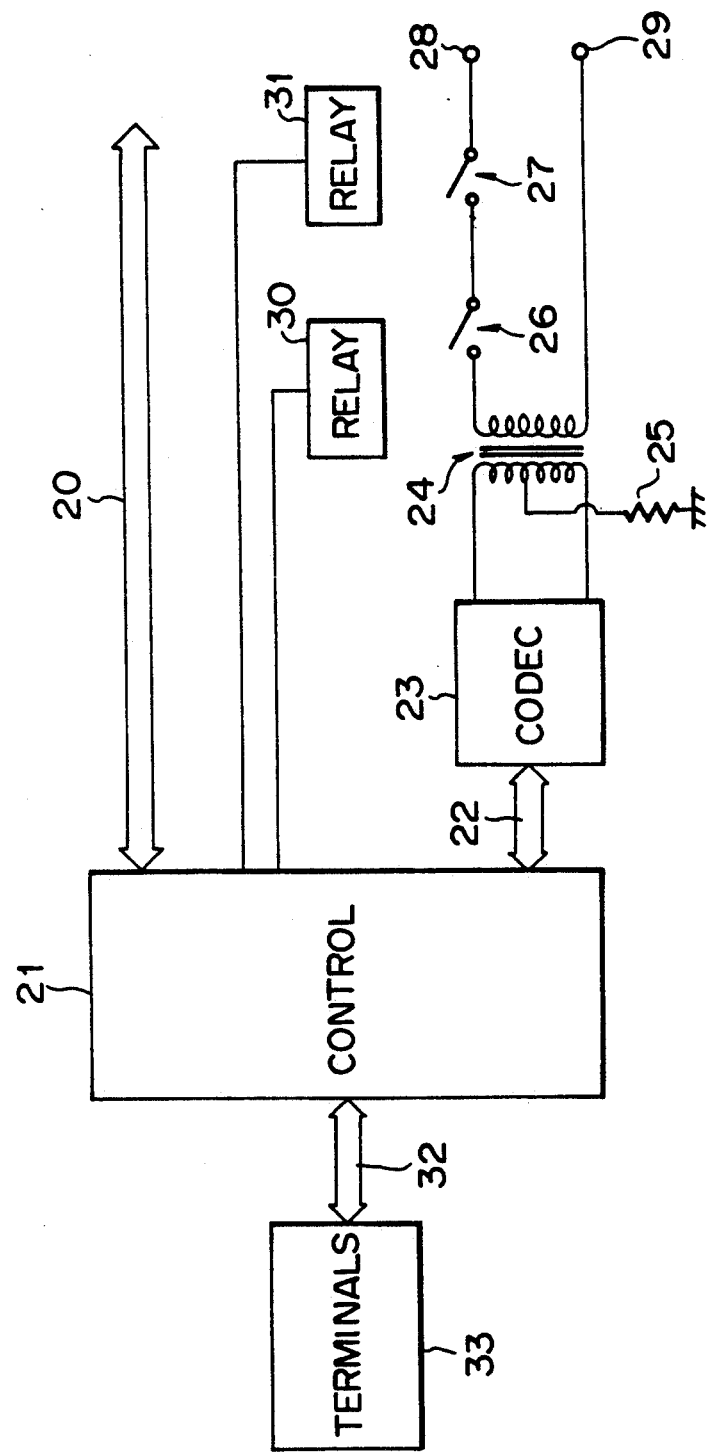
FIG. 6 is a partial block diagram of a MODEM used in an adaptor of FIG. 5.

Referring to FIG. 6 wherein a circuit diagram which is used in the adaptor 13 of FIG. 5, instead of the NCU employed within the MODEM 2a in FIG. 3, is illustrated, the newly devised NCU comprises a control 21 which activates the adaptor 13 itself by, for example, the initiation key on the telephone set 11b, a data line 20 to be coupled to the RF communication control 2b-3, a codec 23 coupled to the control 21 via data line 22 and provided with the functions of filtering and analog/digital conversion, a hybrid transformer 24 whose primary winding is connected to the codec 23, relays 30 and 31 controlled with control signal from the control 21, and a terminal 33 connected to the control 21 at one end via a data line 32 and to be connected to the automobile telephone device 11 at the other end.

A balancing resistor 25 is connected to the center tap of the primary winding of the hybrid transformer 24. Relay contacts 26 and 27 connected in series with each other and with respect to one end of the secondary winding of the hybrid transformer 24 are used for generating dial signals and line switching signals, respectively. Terminals 28 and 29 serving as outputs of the secondary winding of the hybrid transformer 24 are coupled to the ordinary telephone subscriber line.

The relay contacts 26 and 27 are operatively included in the relays 30 and 31, respectively, and the combination of the relay 31 and the contact 27 serves as an off-hook means for off-hooking between the facsimile device 15 and the ordinary telephone subscriber line.

Figure 7:
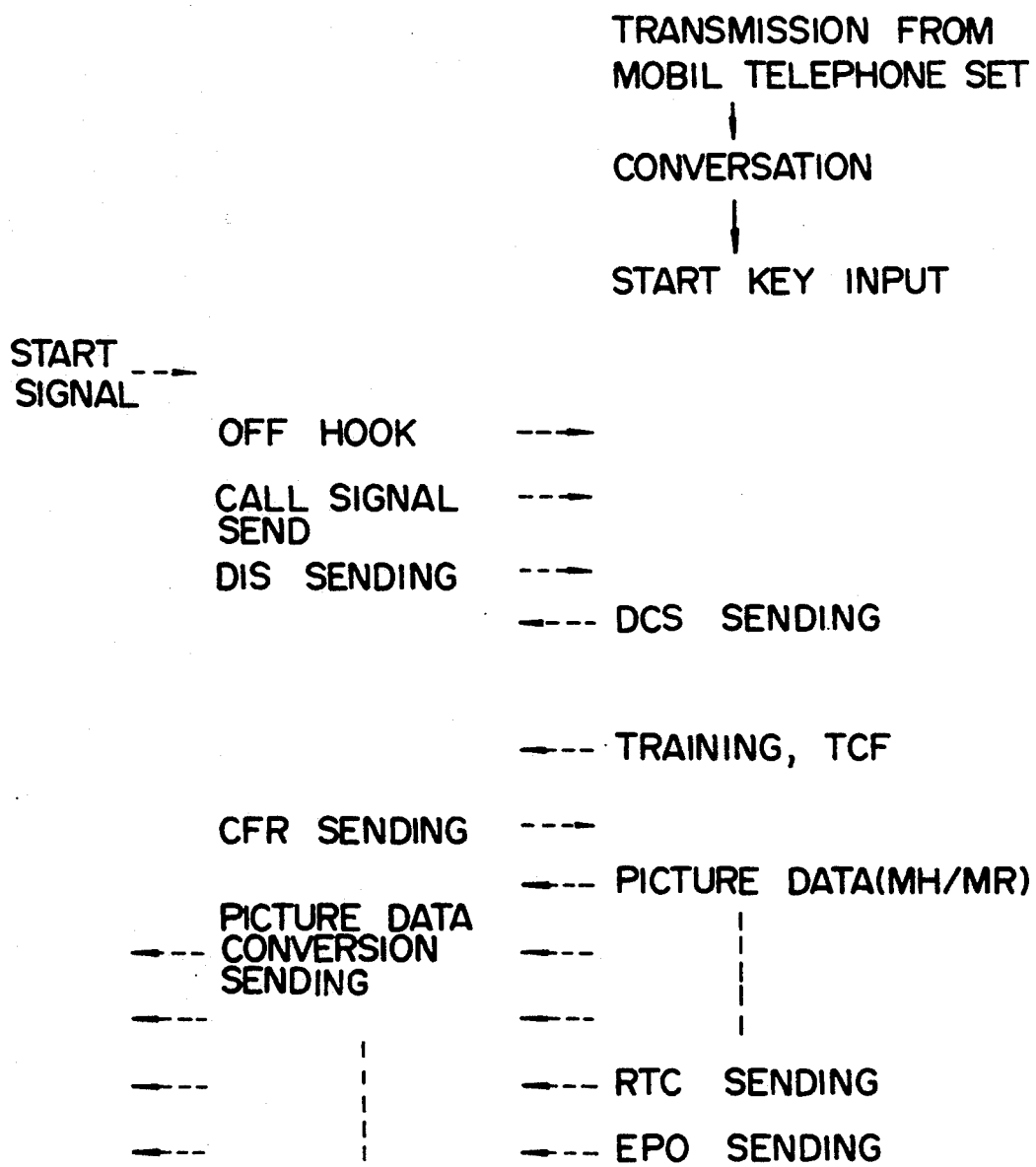

Operation of the first embodiment shown in FIGS. 5 and 6 will hereinafter be explained with reference to FIG. 7 which shows a sequence diagram describing the transmission of picture data from PHASE B to PHASE C.

Supposing that the manuscript is to be transmitted from the facsimile device 15 after conversing with the called party by means of the automobile telephone device 11b, the operator is invited at first to set the manuscript to be transmitted in the facsimile device, input its dial number by means of the telephone set 11b, call the destined party by depressing the initiation key and then converse with that party. At the end of conversation, the operator depresses again the initiation key on the telephone set 11b. Then, the off-hook signals S10 assigned to the initiation key is sent to the radio transceiver 11a by way of the serial data line. Simultaneously with this, the MODEM 2a shown in FIG. 3 reads the off-hook signal S10, interprets it as the data from the initiation key and notifies it to the controller 2b. In other words, the off-hook signal S10 will be applied to the controller 21 over the data line 32 shown in FIG. 6 and interpreted therein.

Figure 1:
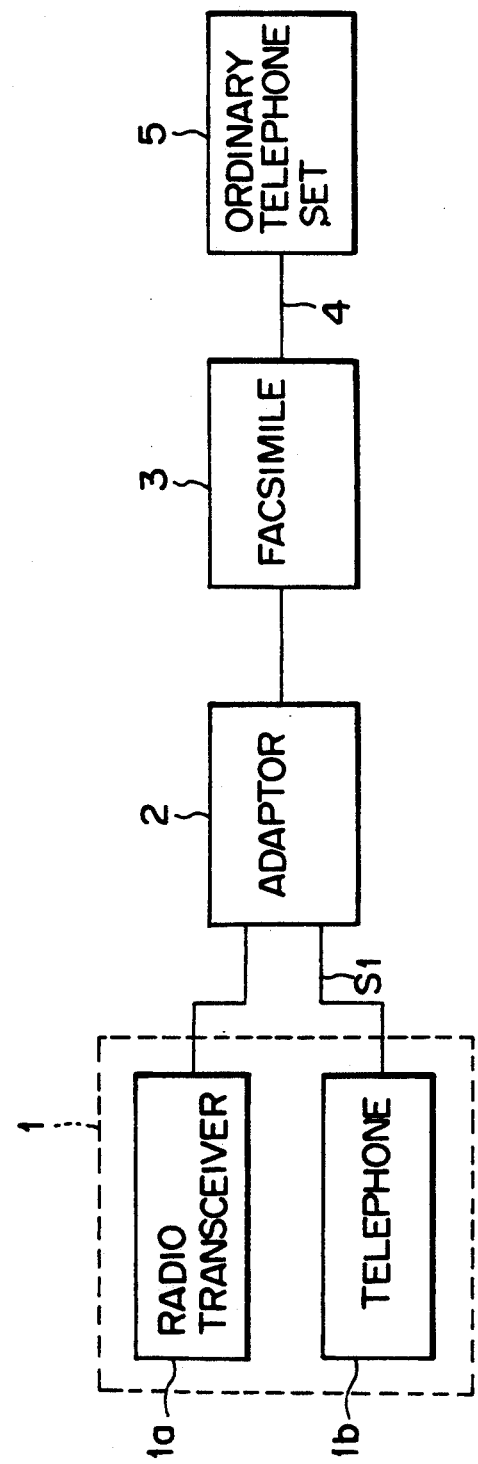
FIG. 1 is a functional block diagram of a conventional mobile facsimile telecommunications system presented for explaining drawbacks to be solved by a first embodiment of the present invention.

Then, the MODEM 2a outputs the off-hook signal on the serial data line and holds the automobile telephone line. As the result, the control 21 turns the relay 31 on to close the contact 27, so that a loop is formed between the facsimile device 15 and the telephone line via the cable 16 in FIG. 5, thereby permitting the off-hook condition to be established therebetween. In short, the off-hook condition described above just corresponds to the same condition as the handset of the ordinary telephone set illustrated in FIG. 1 is taken up.

Next, the controller 2b receives the off-hook signal S10 and controls the central office line part 2d to send out a call signal (2100 Hz) and a DIS (Digital Identification) signal to the facsimile device 15. Thereafter, the operator is required to depress the initiation key on the telephone set 11b and then manipulate a start key on the facsimile device 15. As the result of the manipulation of the start key on the facsimile device 15, the facsimile device 15 provides a DCS (Digital Command) signal and a TCF (Training Check) signal to the adaptor 13, and the adaptor 13 provides a CFR (Reception Ready Confirmation) signal to the adaptor 13. Since the line loop is already formed between the facsimile device and the adaptor, the communication states corresponding to PHASE A (Call setting) and PHASE B (Premessage procedure) in conformity with the T-30 procedure recommended by CCITT are established.

Then, the facsimile device 15 outputs picture data (MH/MR) to the automobile telephone device 11 through the adaptor 13. The transmission of the picture data will be completed when RTC and EOP signals are generated from the facsimile device 15. Like these, the communication between the facsimile device 15 and the G3 communication control 2b-1 is effected in accordance with the procedures of PHASEs B, C, D and E.

During the PHASE C (Message transmission), the RF communication control 2b-3 converts the data from the main control 2b-2 into a data format suitable for wireless transmission and provides the converted data to the MODEM 2a. The MODEM 2a converts the data into codes suitable for error correction control and sends them out to the automobile telephone device 11 by way of the NCU shown in FIG. 6. In short, the control 21 receives the data from the RF communication control 2b-3 on the data line 20, encodes them and provides the encoded data to the codec 23 on the data line 22. The codec 23 converts the digital signals into analog signals which are delivered to the terminals 5 through the hybrid transformer 24, the contact 26 of the relay 30 and the contact 27 of the relay 31.

As clearly understood by those skilled in the art, the inventive mobile facsimile communication adaptor capable of accomplishing the simplification of its construction as well as the reduction of telephone charges may not be limited to the first embodiment explained hitherto. For example, although the combination of the relay 31 and the contact 27 is used as an off-hook means, any other means may be used as well provided that the facsimile device 15 and the adaptor 13 can be placed under off-hook condition through the cable 16.

Figure 2:
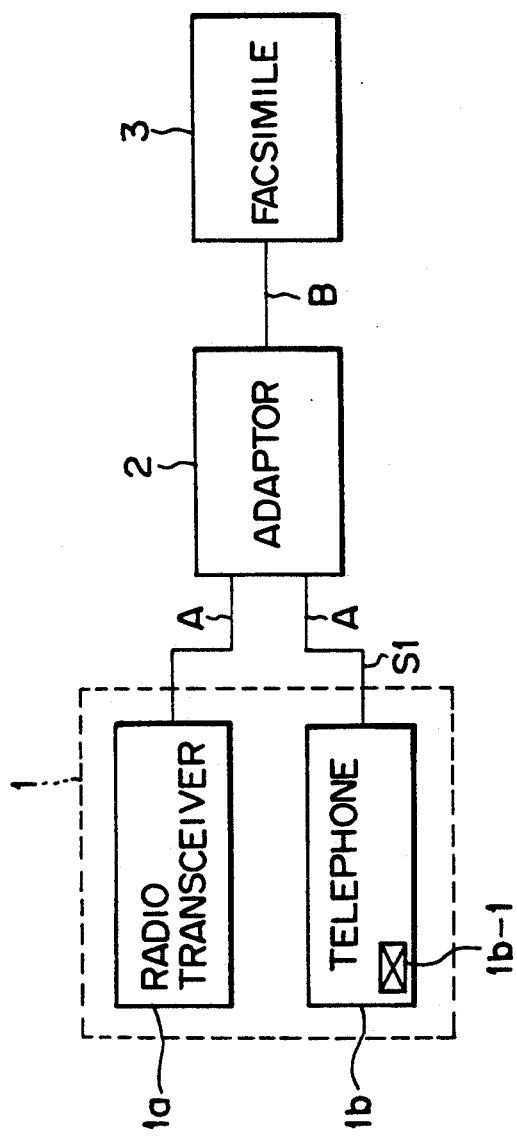
FIG. 2 is a similar diagram useful for explaining drawbacks to be solved by a second embodiment of the present invention.
Figure 4:
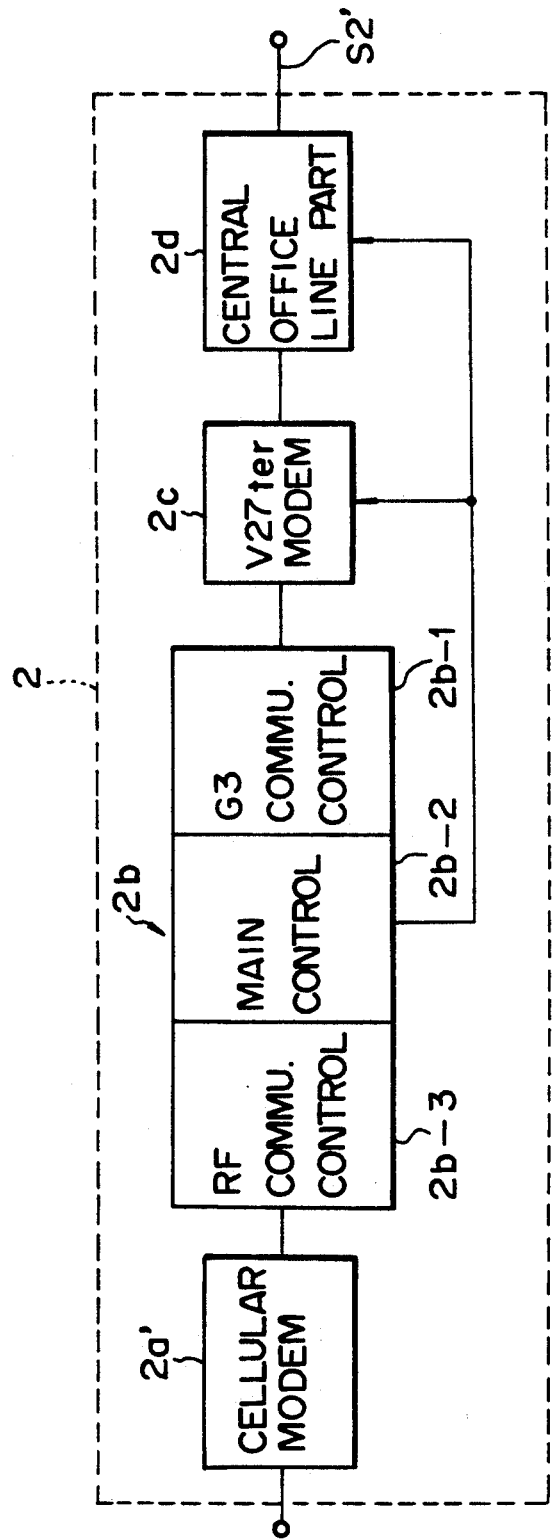
FIG. 4 is a functional block diagram of an adaptor in FIG. 2.

FIG. 8 shows a communication sequence from the generation of the call signal S2' (PHASE 2) to the transmission of the picture data (PHASE C), which is useful for explaining an improved facsimile telecommunications system embodied as a second embodiment with respect to the system in FIGS. 2 and 4. Abbreviated notations employed in FIG. 8 are all based on the CCITT Recommendation T-30.

In order to transmit the content of the manuscript by use of the facsimile device 3 after conversing with the specified receiving side using the telephone set 1b on the wireless telephone device 1, the following steps (1) through (3) are sequentially effected.

(1) In step 10, the operator sets the manuscript to the facsimile device 3, places the system under its automatic response mode that couples the line automatically in response to a call from the other party, and then presets to a polling transmission mode wherein the manuscript set previously by the transmission party is transmitted in reply to the demand from the receiving party when an ID number of the other party or receiving side's identity coincides with another ID number of a destined party. In general, the confirmation of the other party's identity will be made through the verification between an ID number registered by the transmission party and an ID number sent from the receiving party. However, in this embodiment, such an ID number for the receiving party is not set at the time of setting of the polling transmission mode, but a predetermined default value (value to be fetched when an ID number is not registered) is set as it is.

(2) In step 11, the operator calls the destined party on the telephone using the telephone set 1b on the wireless telephone device 1 and converses with the destined party.

(3) In step 12, the operator depresses the key 1b-1 on the telephone set 1b after the conversation with the called party is ended. Then, the initiation signal S1 assigned in advance to the key 1b-1 is transmitted to the transceiver 1a via the cable A. At this juncture, the cellular model 2a' in the adaptor 2 reads the data on the up-serial signal line of the cable A, interprets it as data from the key 1b-1 and informs the controller 2b of the result of interpretation. Immediately after this, the cellular MODEM 2a' outputs an off-hook signal on the up-serial signal line in order to hold the automobile telephone line. The controller 2b receives the aforesaid notification and outputs a control signal to the central office line part 2d. The central office line part 2d outputs the call signal S2' to the facsimile device 3 in response to the control signal from the controller 2b.

The facsimile device 3 receives the call signal S2' and starts to operate the automatic response function in response thereto, thereby allowing the system to be held under the off-hook condition. And, after a quiet state for about two minutes, it sends out a response signal (2100 Hz) and a DIS (R:Receive) signal (Digital Identification Signal), successively. Contrary to this, the adaptor 2 sends out a DIS (S/R: Send/Receive) signal, waits for the arrival of the aforesaid response signal and the DIS (R), and thereafter sends out a DTC (Digital Transmission Command) signal to the facsimile device 3. At this point, the adaptor 2 recognizes that the facsimile device 3 is placed under its transmission mode, i.e. so-called its necessary negotiation is concluded.

Successively, the facsimile device 3 sends out a TCF (Training Check) signal to the adaptor 2 and receives a CFR (Confirmation to Receive) signal from the receiving side via the adaptor 2. This condition just corresponds to a state under which the necessary procedure prior to communication becomes established. As the result, the adaptor 2 reads the content of the manuscript and proceeds to a picture data transmission sequence.

When the picture data are to be transmitted from the facsimile device 3 to the receiving side, the picture data are compressed by use of a predetermined compression system, such as a MH (Modified Huffman Coding) system or a MR (Modified Read Coding) system recommended by CCITT, or a MMR (Modified Modified Read Coding) system.

The facsimile device 3 sends out each of a RTC (Control Recovery) signal and a EPO (End of Procedure) signal, after the completion of the picture data transmission. Thus, the receiving side sends out a MCF (Message Confirmation) signal (not shown). Thereafter, the facsimile device 3 generates a DCN (Disconnect) signal, cuts off the transmission line and ceases the transmission of the manuscript.

As clearly understood from the foregoing by those skilled in the art, the polling transmission function of the facsimile device in this second embodiment is quite different from that employed in the prior art. The improved facsimile transmission system described in accordance with the second embodiment including the steps of setting the facsimile device to the automatic response function mode as well as to the polling transmission function mode using a given default value, thereafter depressing the key on the telephone set, thereby enabling the facsimile device to be automatically off-hooked at an appropriate stage during its transmission operation, is not necessarily limited to the second embodiment mentioned above. For example, a train or the like can be used as a moving body instead of an automobile. The aforesaid technical idea of accomplishing the facsimile transmission system can also be applied to the case wherein the content of the manuscript is transmitted without any conversation after telephoning. In addition, instead of the key 1b-1 used for providing the initiation signal S1, any other key to which other function is assigned may be commonly used to generate the initiation signal S1.

While the invention has been particularly shown and described with reference to certain preferred embodiments, it will be understood by those skilled in the art that various alterations and modifications in form and detail, in addition to alternatives described above, may be made therein. Accordingly, it is intended that the following claims cover all such alterations and modifications as fall within the true spirit and scope of the invention.

What we claim is:

1. A method of performing mobile facsimile communication by utilizing a wireless telephone device in a moving body and a facsimile device having automatic response comprising the steps of:

setting a manuscript to be transmitted in said facsimile device; and setting said facsimile device to automatic response, wherein said facsimile device is automatically set in an automatic response mode in response to an initiation signal generated by said wireless telephone device, a cellular modem detects said initiation signal, transmits an off-hook signal to a controller and said controller generates a call signal, causing said facsimile device to automatically carry out a facsimile telecommunications after receiving said call signal.

2. A method of performing mobile facsimile communication according to claim 1, further comprising the step of calling the receiving party on the telephone and receiving a confirmation signal therefrom by means of said wireless telephone device prior to facsimile communications.

3. A method of performing mobile facsimile communication according to claim 2, further comprising the step of manipulation of a key for off-hooking said facsimile device after receiving the confirmation signal.

4. A mobile facsimile communication apparatus comprising:

a facsimile device having an automatic response device;

a wireless telephone device for generating an initiation signal to set an automatic response mode in said facsimile device;

a cellular MODEM for detecting said initiation signal and transmitting an off-hook signal;

a controller for receiving said off-hook signal and generating a call signal which causes said facsimile device to automatically carry out a facsimile telecommunication after receiving said call signal.

5. The mobile facsimile communication apparatus of claim 4 wherein said cellular MODEM and said controller are located in an adaptor.

6. The mobile facsimile communication apparatus of claim 4 further comprising a key for off-hooking said facsimile device.

7. A mobile facsimile communication apparatus for transmitting a content of a manuscript from a moving body to another by utilizing wireless telephone devices respectively installed thereon comprising:

a facsimile device having automatic response and a predetermined key to send an initiation signal; and an adaptor for receiving said initiation signal, said adaptor having a MODEM for sending an off-hook signal for automatically off-hooking another facsimile device in response to said initiation signal.

* * * * *

UNITED STATES PATENT AND TRADEMARK OFFICE
CERTIFICATE OF CORRECTION

PATENT NO. : 5,263,078
DATED     : November 16, 1993
INVENTOR(S) : Chusei Takahashi (as corrected) and Hiroshi Etoh It is certified that error appears in the above-identified patent and that said Letters Patent is hereby corrected as shown below:

On the Title Page, Item [75]:
IN THE LIST OF INVENTORS, DELETE "CUISEI" AND INSERT --CHUSEI--.

Signed and Sealed this

Nineteenth Day of April, 1994

Attest:

BRUCE LEHMAN

*Attesting Officer*     *Commissioner of Patents and Trademarks*